United States Patent
Kinoshita et al.

(10) Patent No.: US 7,913,028 B2
(45) Date of Patent: Mar. 22, 2011

(54) DATA PROCESSING SYSTEM HAVING MULTIPLEXED DATA RELAYING DEVICES, DATA PROCESSING APARATUS HAVING MULTIPLEXED DATA RELAYING DEVICES, AND A METHOD OF INCORPORATING DATA RELAYING DEVICES IN DATA PROCESSING SYSTEM HAVING MULTIPLEXED DATA RELAYING DEVICES

(75) Inventors: Takayuki Kinoshita, Kawasaki (JP); Junji Ichimiya, Kawasaki (JP); Shintaro Itozawa, Kawasaki (JP); Koichi Odahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 969 days.

(21) Appl. No.: 11/785,903

(22) Filed: Apr. 20, 2007

(65) Prior Publication Data

US 2008/0043734 A1 Feb. 21, 2008

(30) Foreign Application Priority Data

Aug. 16, 2006 (JP) ................. 2006-222092

(51) Int. Cl.
*G06F 13/00* (2006.01)
*G06F 11/16* (2006.01)
(52) U.S. Cl. ............ 710/317; 710/104; 710/316; 714/3; 714/43

(58) Field of Classification Search .................. 710/104, 710/317, 306, 316; 714/3, 43
See application file for complete search history.

(56) References Cited

U.S. PATENT DOCUMENTS

| 6,035,414 | A | 3/2000 | Okazawa et al. | |
|---|---|---|---|---|
| 6,694,395 | B1 * | 2/2004 | Tanaka | 710/100 |
| 7,188,201 | B2 * | 3/2007 | Harima et al. | 710/104 |
| 7,633,856 | B2 * | 12/2009 | Ikawa | 370/217 |

FOREIGN PATENT DOCUMENTS

| JP | 61-245262 | 10/1986 |
|---|---|---|
| JP | 02-194446 | 8/1990 |
| JP | 10-143465 | 5/1998 |
| JP | 2001-318901 | 11/2001 |

OTHER PUBLICATIONS

KVH Co., Ltd. "Fiber channel leased line service (tentative name)" Feb. 4, 2003 pp. 1-13.
J. Goldie, Interface Products, National Semiconductor "LVDS goes the Distance", SID'99 Paper, pp. 1-4. 1999.
"New Expert of Network Management—Optivity Network Configuration System", Network & Information, the $11^{th}$ Journal, Dec. 31, 2008.

* cited by examiner

*Primary Examiner* — Glenn A Auve
(74) *Attorney, Agent, or Firm* — Staas & Halsey LLP (57) ABSTRACT

When a new data relaying device that has yet to have configuration information set therein is incorporated, the configuration information of an existing data relaying device is copied to the new data relaying device.

7 Claims, 9 Drawing Sheets

FIG.3

| CMDM [5:0] | REQUEST | DIRECTION | DESCRIPTION OF REQUEST |
|---|---|---|---|
| 000101 | GSA START | SB->AXB | INITIALIZATION OF SBS BY AXB |

DATA PROCESSING SYSTEM HAVING MULTIPLEXED DATA RELAYING DEVICES, DATA PROCESSING APARATUS HAVING MULTIPLEXED DATA RELAYING DEVICES, AND A METHOD OF INCORPORATING DATA RELAYING DEVICES IN DATA PROCESSING SYSTEM HAVING MULTIPLEXED DATA RELAYING DEVICES

CROSS REFERENCE TO RELATED APPLICATIONS

The present application is based on Japanese Priority Patent Application No. 2006-222092, filed Aug. 16, 2006, the entire contents of which are hereby incorporated by reference.

BACKGROUND OF THE INVENTION

1. Field of the Invention

The present invention relates to relaying requests and responses by using a plurality of data relaying devices that have shared data.

2. Description of the Related Art

Multi-processor configurations have been used to quickly process ever-increasing data in computing devices (for example, servers, workstations, personal computers, etc.) used in various systems.

A typical multi-processor configuration usually includes a data relaying device (for example, a crossbar switch, etc.) to improve the speed of data transfer among a plurality of central processing units (CPUs), main memories, and I/O devices.

Even though such data relaying devices improve the performance of the computing devices, if the system encounters some problem due to which the various processes performed by it are suspended, the enterprise offering various services using the system will incur heavy losses. Various remedial measures have been proposed for restoring the system in the event of a system-down situation and improving the reliability of such systems.

For example, a technology proposes providing two crossbar switches, the second one being a backup crossbar switch that can be used when the first one fails.

Further, in the technology disclosed in Japanese Patent Application Laid-open No. H10-143465, extra input/output ports are provided in the crossbar switch. If any input/output port fails, other input/output port is used.

In the technology proposing two crossbar switches, however, the system needs to be shut down to replace the failed crossbar switch.

In the technology proposed in Japanese Patent Application Laid-open No. H10-143465, again, if the crossbar switch itself breaks down, the system needs to be shut down to replace the failed crossbar switch.

SUMMARY OF THE INVENTION

It is an object of the present invention to at least partially solve the problems in the conventional technology.

According to an aspect of the present invention, a data processing system configured by connecting each of a plurality of data relaying devices that have set therein a common configuration information to a request control unit, and connecting the data relaying devices and the request control devices to a control device, and that sends requests and responses to the requests from devices under the control of the request control devices to the request control devices via the data relaying devices. The control device includes a configuration information copying unit that, when a new data relaying device that has yet to have the configuration information set therein is incorporated in the data processing system, retrieves configuration information from an existing data relaying device and copies the retrieved configuration information to the new data relaying device; a stop-command issuing unit that, when the configuration information copying unit completes copying of the configuration information, issues a stop-request command instructing the request control devices to stop sending requests to the existing data relaying device; a start-operations command issuing unit that, upon receiving a request completion notification indicating that all the requests received by the existing data relaying devices have been processed, issues a start-operations command instructing all the data relaying devices to start operating; and a start-command issuing unit that issues a start-request command instructing the request control devices to start sending requests to the data relaying devices, once the start-operations command issuing unit issues the start-operations command. The data relaying device includes a request completion notifying unit that, upon suspension of sending of requests and reception of responses by the control device, determines whether the requests received before the enforcement of the stop-request command have been processed, and sends the request completion notification to the control device if the requests have been processed.

According to another aspect of the present invention, a method of controlling a data processing system configured by connecting each of a plurality of data relaying devices that have set therein a common configuration information to a request control unit, and connecting the data relaying devices and the request control devices to a control device, and that sends requests and responses to the requests from devices under the control of the request control devices to the request control devices via the data relaying devices. The control device performs retrieving, when a new data relaying device that has yet to have the configuration information set therein is incorporated in the data processing system, configuration information from an existing data relaying device and copying retrieved configuration information to the new data relaying device; first issuing including issuing, when the copying is completed, a stop-request command instructing the request control devices to stop sending requests to the existing data relaying device; second issuing including issuing, upon receiving a request completion notification indicating that all the requests received by the existing data relaying devices have been processed, a start-operations command instructing all the data relaying devices to start operating; and third issuing including issuing a start-request command instructing the request control devices to start sending requests to the data relaying devices, once the start-operations command is issued at the second issuing. The data relaying device performs determining, upon suspension of sending of requests and reception of responses by the control device, whether the requests received before the enforcement of the stop-request command have been processed, and sending the request completion notification to the control device if the requests have been processed.

According to still another aspect of the present invention, an information processing device that includes a control device with a plurality of data relaying devices that share a common information and relay transmission data within the information processing device being connected to the control device, includes a communication control unit that controls communication among the data relaying device; and a configuration information copying unit that, when a new data relaying device is connected to the control device, reads configuration information of an existing data relaying device connected to the control device and writes the configuration information read from the existing data relaying device to the new data relaying device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings. The terms used in a first embodiment of the present invention will be described first, followed by an overview and salient feature of the data processing system according to the first embodiment, the configuration and process flow, and finally the effects due to the first embodiment.

The terms used in the first embodiment will be described first. An address crossbar switch is a device that mediates data transfer between the various elements of the data processing system. Specifically, the address crossbar switch is a control device that sends requests (for example, read data requests, write data requests) received from central processing units (CPUs) that are under the control of northbridges and southbridges to the northbridges and the southbridges, and likewise sends responses to the request received from the northbridges and the southbridges to the northbridges and the southbridges. Thus, an address crossbar switch is a data relaying device.

Specifically, upon receiving a request from the northbridge, the address crossbar switch arbitrates the request and broadcasts the request to all the northbridges and the southbridges. Upon receiving from the northbridges and the southbridges a response (for example, cache information, etc.) to the request, the address crossbar switch merges the responses from all the northbridges and the southbridges, and sends a merged request response to the northbridges and the southbridges.

A northbridge is a device that controls the various devices that are connected to the system (such as CPU's or memories) and receives requests from the CPUs from among those devices, and outputs request responses. Specifically, when a request is received from a CPU and when response can not be made to the request, the northbridge sends the request to the address crossbar switch, and if a response can be made, the northbridge sends a response to the CPU. Thus, a northbridge is a request control device.

When a northbridge receives a merged request response and if the CPU that has sent the merged request response is under control of the northbridge, the northbridge sends the request response to the CPU. If the CPU is not under the control of the northbridge, the northbridge destroys the request response.

Upon receiving a request from an address crossbar switch, a northbridge sends a response to the request to the address crossbar switch. For example, if a northbridge receives a request from an address crossbar switch and if the northbridge is managing the data to be sent in response to the request, the northbridge sends to the address crossbar switch cache information as a response to the request. If the northbridge is not managing the data, the northbridge sends to the address crossbar switch a message conveying that it is not managing the requested data.

A southbridge is a device that controls PCI bridges, etc., and controls data concerning input/output interfaces. A southbridge receives a request from a PCI bridge and outputs a response to the request. Upon receiving a request from an address crossbar switch, a southbridge sends a response to the address crossbar switch. Specifically, if a southbridge receives a request from an address crossbar switch and if the southbridge is managing the data to be sent in response to the request, the southbridge sends to the address crossbar switch cache information as a response to the request. If the southbridge is not managing the data, the southbridge sends to the address crossbar switch a message conveying that it is not managing the requested the data.

When a southbridge receives a merged request response and if the PCI bridge that has sent the merged request response is under control of the southbridge, the southbridge sends the request response to the PCI bridge. If the PCI bridge is not under the control of the southbridge, the southbridges destroys the request response. Thus, a southbridge, in the same manner as the northbridge, is a request control device.

A snoop circuit is a circuit that performs a predetermined operation according to the address being accessed by the various devices (such as the CPU, memory, and I/O device). Specifically, the snoop circuit reads data from and writes data to the address being accessed by the CPU, I/O device, etc., based on snoop conditions that indicate the operating conditions stored in configuration information.

The term configuration information refers to registry data, such as connection information, of each device. In a system that includes a plurality of address crossbar switches, all the address crossbar switches will have the same configuration information. Specifically, configuration information refers to registry data such as SB snooper architecture register, operation register (OPSR), configuration register (CFR), and snoop conditions.

A Managementboard (MMB) is a device that controls the address crossbar switches, the northbridges, and the southbridges. Specifically, an MMB turns connection ports used by the address crossbar switches physically online, performs Mori-Muta Transceiver Logic (MTL) calibration on all the northbridges and the southbridges, and checks whether the northbridges and the southbridges are functioning properly.

Figure 1:
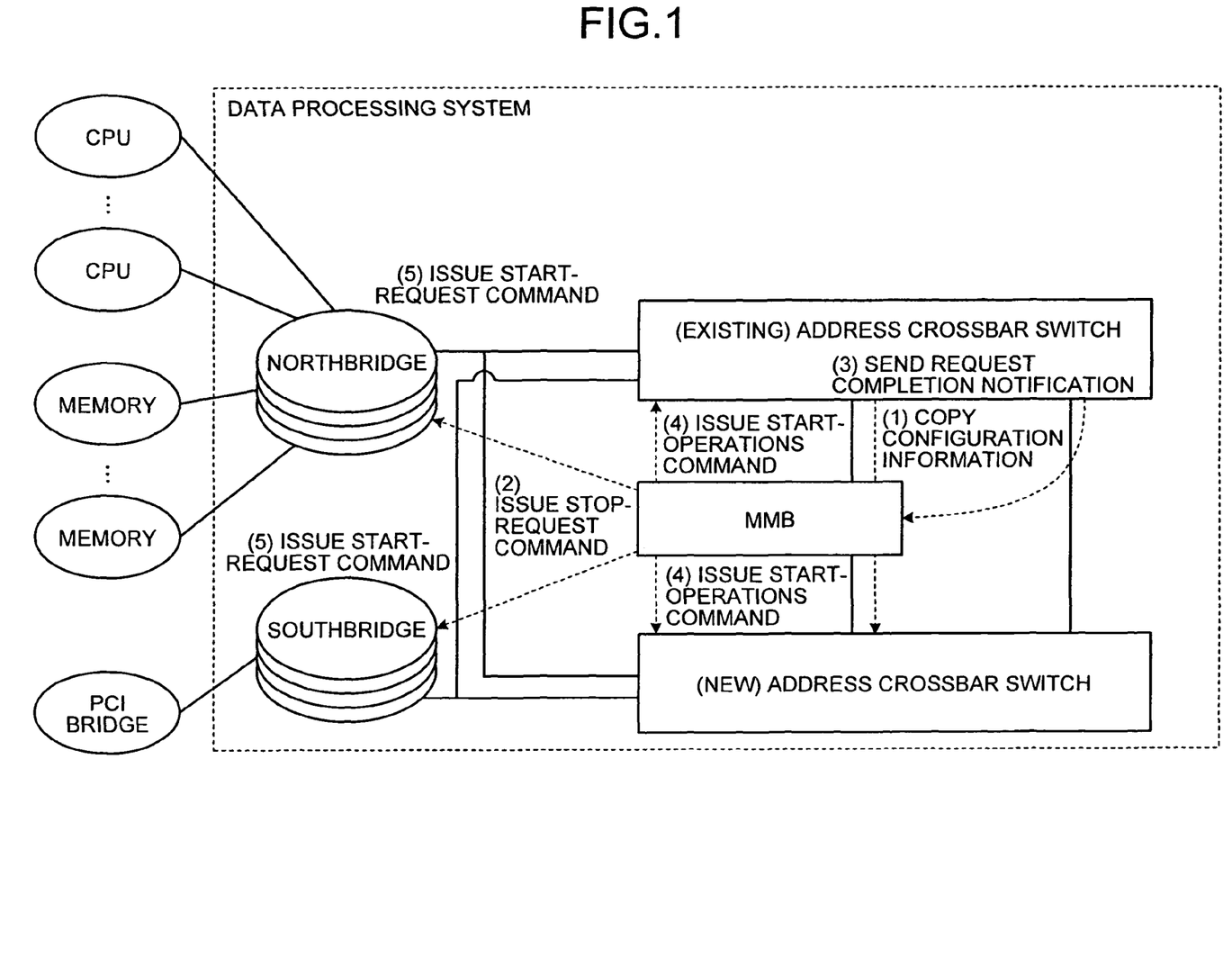
FIG. 1 is a schematic for explaining overview and salient features of a data processing system according to a first embodiment of the present invention.

The overview and salient feature of the data processing system according to the first embodiment is described below. FIG. 1 is a schematic for explaining the overview and salient feature of the data processing system according to the first embodiment.

As shown in FIG. 1, the data processing system includes one or more northbridges to which a plurality of CPUs and memories is connected, one or more southbridges to which a plurality of PCI bridges is connected. In other words, the CPUs and the memories are under the control of the northbridge, and the PCI bridges are under the control of the southbridges. Moreover, a plurality of address crossbar switches are commonly connected to each of the northbridges and the southbridges, and an MMB is commonly connected to each of the address crossbar switches, the northbridges, and the southbridges.

The data management system sends requests received from various devices (CPUs, memories, etc.) under the control of the northbridges/southbridges to the northbridges/southbridges via the address crossbar switches, and the responses received from the various devices (CPUs, memory, etc.) to the northbridges/southbridges via the address crossbar switches. In particular, a new address crossbar switches can be augmented into the system without having to stop the entire system.

To explain the salient feature in more detail, when a new address crossbar switch that has yet to have the configuration information set therein is incorporated, the MMB retrieves the configuration information from an existing address crossbar switch and copies the configuration information to the new address crossbar switch (see (1) of FIG. 1). The configuration information can be registry data such as SB snooper architecture register, OPSR, CFR, and snoop conditions. The MMB retrieves the configuration information from the registry of an existing address crossbar switch, and copies the configuration information retrieved to the newly incorporated address crossbar switch.

Once the configuration information is copied to the new address crossbar switch, the MMB instructs the northbridges and the southbridges to stop sending requests to the existing address crossbar switch (see (2) of FIG. 1). Specifically, the MMB issues a stop-request command (such as, PSWC_STOP_LRA) instructing the northbridges and the southbridges to stop sending requests to the existing crossbar switch, and sends a message to the existing address crossbar switch conveying that the northbridges and the southbridges have suspended sending requests.

After the northbridges and the southbridges stop sending requests, the existing address crossbar switch determines whether the requests already received before the enforcement of the stop-request command have been processed. If the requests have been processed, the existing address crossbar switch notify the MMB that the requests have been processed (see (3) of FIG. 1). Specifically, upon receiving the message from the MMB that the northbridges and the southbridges have suspended sending requests, the existing address crossbar switch implements a response process against the requests already received by them, and once the response process is completed, notify the MMB that the requests have been processed.

Upon receiving the notification from the existing address crossbar switch that the request have been processed, the MMB instructs both the existing address crossbar switch and the new address crossbar switch to start operation (see (4) of FIG. 1). Specifically, upon receiving the notification from the existing address crossbar switch that the request have been processed, the MMB sends a start command (for example, PSWC_START_LRA_START) to both the existing address crossbar switch and the new address crossbar switch to start operating. Both the existing address crossbar switch and the new address crossbar switch start operating when they receive the command from the MMB.

After instructing the address crossbar switches to start operating, the MMB instructs the northbridges and the southbridges to send requests to both the existing address crossbar switch and the new address crossbar switch (see (5) of FIG. 1). Specifically, once the address crossbar switches start operating, the MMB sends the northbridges and the southbridges a start-request command (for example, PSWC_START_LRA). Upon receiving the start-request command, the northbridges and the southbridges start sending requests to the existing address crossbar switch as well as the new address crossbar switch.

Thus, an address crossbar switches can be augmented into the data processing system without having to stop the entire system.

Figure 2:
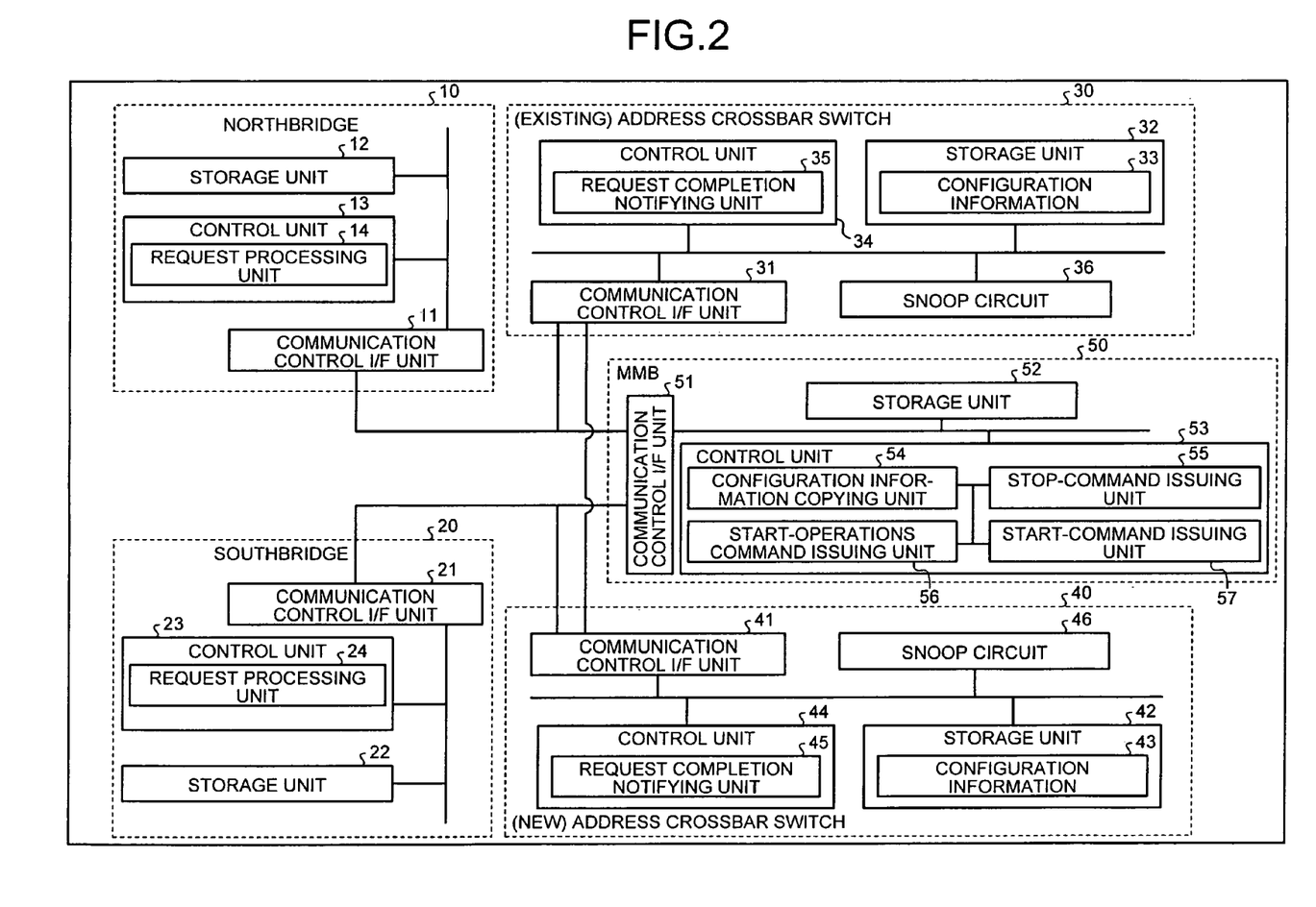
FIG. 2 is a detailed block diagram of the data processing system shown in FIG. 1.
Figure 3:
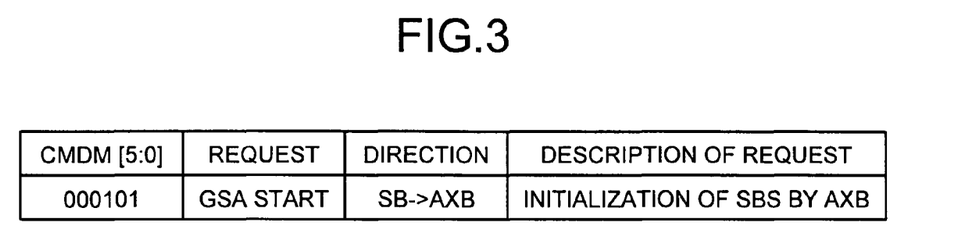
FIG. 3 is an example of contents of a packet sent by the data processing system shown in FIG. 1.
Figure 8:
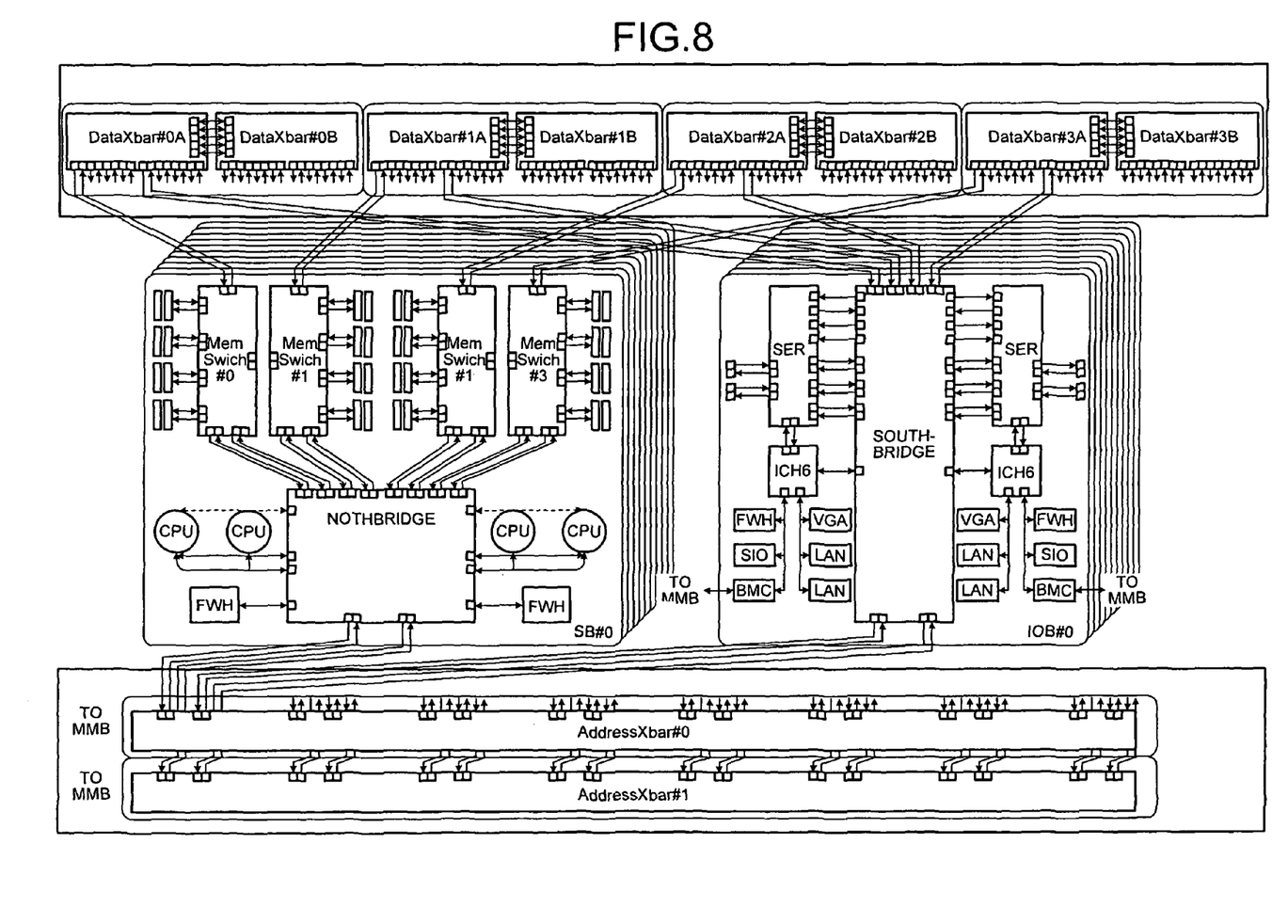
FIG. 8 depicts an exemplary hardware configuration of the data processing system shown in FIG. 1.

FIG. 2 is a detailed block diagram of the data processing system shown in FIG. 1. FIG. 3 depicts an example of the contents of a packet sent by the data processing system. FIG. 8 is depicts an exemplary hardware configuration of the data processing system.

The data processing system includes a northbridge 10, a southbridge 20, an existing address crossbar switch 30, a new address crossbar switch 40, and an MMB. Typically, however, there are a plurality of northbridges, southbridges, and existing address crossbar switches. The northbridge 10 includes a communication control I/F unit 11, a storage unit 12, and a control unit 13. The communication control I/F unit 11 controls communication among the various devices (CPUs, memories, etc.), the existing address crossbar switch 30, the new address crossbar switch 40, and the MMB 50. Specifically, the communication control I/F unit 11 physically connects the existing address crossbar switch 30, the new address crossbar switch 40, and the MMB 50 with one another using an LSI (not shown).

The control unit 13 includes an internal memory (not shown) for storing control programs, computer programs for various process procedures, and various data required for implementing the computer programs. The control unit 13 includes a request processing unit 14.

The storage unit 12 stores therein data and computer programs required for the various processes performed by the control unit 13. Specifically, the storage unit 12 stores therein connection information of all the devices connected to the communication control I/F unit 11. The connection information is used by the request processing unit 14 to send requests.

The request processing unit 14 facilitates sending and receiving of requests and responses among devices connected to the northbridge 10. For example, the request processing unit 14 receives a request from a CPU, and if no response is possible for the request, sends the request to the address crossbar switches. If a response is not possible, the request processing unit 14 sends a response to the CPU that sent the request.

Upon receiving a merged request response from an address crossbar switch in response to a request, the request processing unit 14 sends the merged request response to the CPU that had sent the request, provided the northbridge 10 is managing the CPU that had sent the request. If the CPU is not managed by the northbridge 10, the request processing unit 14 destroys the merged request response.

Upon receiving a request from an address crossbar switch, the request processing unit 14 sends a response to the address crossbar switch. For example, upon receiving a request from an address crossbar switch, the request processing unit 14 sends cache information as a response to the address crossbar switch, provided the northbridge 10 is managing the data to be sent in response to the request. If the northbridge 10 is not managing the data to be sent in response to the request, the request processing unit 14 sends to the address crossbar switch a message conveying that the data is not managed by the northbridge 10.

The southbridge 20 includes a communication control I/F unit 21, a storage unit 22, and a control unit 23. The communication control I/F unit 21 controls communication among the northbridge 10, the existing address crossbar switch 30, the new address crossbar switch 40, and the MMB 50. Specifically, the communication control I/F unit 21 physically connects the northbridge 10, the existing address crossbar switch 30, the new address crossbar switch 40, and the MMB 50 with one another using an LSI (not shown).

The control unit 23 includes an internal memory (not shown) for storing control programs, computer programs for various process procedures, and various data required for implementing the computer programs. The control unit 23 includes a request processing unit 24.

The storage unit 22 stores therein data and computer programs required for the various processes performed by the control unit 23. Specifically, the storage unit 22 stores therein connection information of all the devices connected by the communication control I/F unit 21. The connection information is used by the request processing unit 24 to send responses.

The request processing unit 24 performs various processes concerning the requests being sent and received. Specifically, the request processing unit 24 sends requests received from PCI bridges (not shown), etc. to the existing address crossbar switch 30, and receives a response to the request from the existing address crossbar switch 30. For example, upon receiving a request from the PCI bridge or the existing address crossbar switch 30, the request processing unit 24 sends cache information as a response to the existing address crossbar switch 30, provided the southbridge 20 is managing the data to be sent as a response to the request. If the southbridge 20 is not managing the data to be sent in response to the request, the request processing unit 24 sends to the address crossbar switch 20 a message conveying that the data is not managed by the southbridge 30.

Upon receiving a merged response from an address crossbar switch in response to a request, the request processing unit 24 sends the merged request response to the PCI bridge that had sent the request, provided the southbridge 20 is managing the PCI bridge that had sent the request. If the PCI bridge is not managed by the southbridge 20, the southbridge 20 destroys the merged request response.

The existing address crossbar switch 30 includes a communication control I/F unit 31, a storage unit 32, a control unit 34, and a snoop circuit 36. The communication control I/F unit 31 controls communication among the northbridge 10, the southbridge 20, the new address crossbar switch 40, and the MMB 50. Specifically, the communication control I/F unit 21 physically connects the northbridge 10, the southbridge 20, the new address crossbar switch 40, and the MMB 50 with one another using an LSI (not shown), and receives requests from and sends responses to the northbridge 10 and the southbridge 20. Further, the communication control I/F unit 31 synchronizes the existing address crossbar switch 30 with the new address crossbar switch 40.

The control unit 34 includes an internal memory for storing control programs, computer programs for various process procedures, and various data required for implementing the computer programs. The control unit 34 includes a request completion communicating unit 35.

The storage unit 32 stores therein data and computer programs required for the various processes performed by the control unit 34. The storage unit 32 stores therein configuration information 33. The configuration information 33 is data required for the operation of the existing address crossbar switch 30, such as connection data concerning the existing address crossbar switch 30 with the other control devices (such as the northbridge 10, the MMB 50) and snoop conditions which are operating conditions of the snoop circuit 36. The storage unit 32 stores therein registry data such as SB snooper architecture register, OPSR, CFR, and snoop conditions as the configuration information 33.

When the MMB 50 issues a stop-request command suspending requests from being sent, the request completion communicating unit 35 determines whether the requests received before the stop-request command was issued have been processed, and if the requests have been processed, sends a request completed notification to the MMB 50. Specifically, the request completion communicating unit 35 checks whether the memory used for reading or writing data has been freed to determine whether the requests have been processed.

The snoop circuit 36 performs a predetermined operation according to the address in the memory that is being accessed by various devices. Specifically, the snoop circuit 36 reads data or writes data according to the address being accessed by CPU, etc., based on the snoop conditions included in the configuration information 33 stored in the storage unit 32.

The new address crossbar switch 40 includes a communication control I/F unit 41, a storage unit 42, a control unit 44, and a snoop circuit 46. The communication control I/F unit 41, the storage unit 42, the control unit 44, and the snoop circuit 46 are functionally identical to those of the communication control I/F unit 31, the storage unit 32, the control unit 34, the snoop circuit 36, respectively, of the existing address crossbar switch 30. Moreover, the request completion notifying unit 45 is functionally identical to the request completion notifying unit 35 of the existing address crossbar switch 30.

The MMB 50 includes a communication control I/F unit 51, a storage unit 52, and a control unit 53. The communication control I/F unit 51 controls communication among the northbridge 10, the southbridge 20, the existing address crossbar switch 30, and the new address crossbar switch 40. Specifically, the communication control I/F unit 51 physically connects the northbridge 10, the southbridge 20, the existing address crossbar switch 30, and the new address crossbar switch 40 with one another using an LSI (not shown), and sends to the northbridge 10, the southbridge 20, the existing address crossbar switch 30, and the new address crossbar switch 40 the commands issued by a stop-command issuing unit 55 and a start-command issuing unit 57.

The control unit 53 includes an internal memory (not shown) for storing control programs, computer programs for various process procedures, and various data required for implementing the computer programs. The control unit 53 includes a configuration information copying unit 54, the stop-command issuing unit 55, a start-operations command issuing unit 56, and the start-command issuing unit 57.

The storage unit 52 stores therein data and computer programs required for the various processes performed by the control unit 34. The storage unit 32 stores therein details of commands sent (issued) by the stop-command issuing unit 55 and the start-command issuing unit 57. The storage unit 32 stores therein the commands in the format shown in, for example, FIG. 3. In the example shown in FIG. 3, the field CMDM containing the value "000101" indicates the code number of the command, the field request containing the value "GSA START" indicates the command name, the field direction containing the value "SB->AXB" indicates the command destination, and the field details containing the value "Initialization of AXB by SB" indicates the description of the command.

When the new address crossbar switch 40, which has yet to have configuration information set therein, is incorporated into the system, the configuration information copying unit 54 of the MMB 50 retrieves the configuration information from the existing address crossbar switch 30, and copies the configuration information to the new address crossbar switch 40. Specifically, the configuration information copying unit 54 copies the configuration information 33 (registry data such as SB snooper architecture register, OPSR, CFR, and snoop conditions) of the existing address crossbar switch 30 to configuration information 43 of the new address crossbar switch 40.

Once the configuration information copying unit 54 copies the configuration information to the new address crossbar switch 40, the stop-command issuing unit 55 of the MMB 50 instructs the northbridge 10 and the southbridge 20 to stop sending requests to the existing address crossbar switch 30. Specifically, the stop-command issuing unit 55 sends (issues) a stop-request command (PSWC_STOP_LRA) to the northbridge 10 and the southbridge 20. In accordance with the stop-request command, the northbridge 10 and the southbridge 20 stop sending requests to the existing address crossbar switch 30. Once the northbridge 10 and the southbridge 20 stop sending requests, the stop-command issuing unit 55 sends a message (such as a signal) to the existing address crossbar switch 30 notifying that the sending requests has been suspended.

Upon receiving from the existing address crossbar switch 30 a request completed notification indicating that all the requests received before the enforcement of the stop-request command by the northbridge 10 and the southbridge 20 have been processed, the start-operations command issuing unit 56 of the MMB 50 instructs both the existing address crossbar switch 30 and the new address crossbar switch 40 to start operations. Specifically, the start-operations command issuing unit 56 sends (issues) the GSA_START command (PSWC_GSA_START), as shown in FIG. 3, to both the existing address crossbar switch 30 and the new address crossbar switch 40 and causes mirror operation of the existing address crossbar switch 30 and the new address crossbar switch 40 to shift to a default state. In other words, the start-operations command issuing unit 56 returns PRIORITY or cue pointer to the default values of the mirror operation, causing both the existing address crossbar switch 30 and the new address crossbar switch 40 to start operating.

After the start-operations command issuing unit 56 issues the instruction, the start-command issuing unit 57 of the MMB 50 issues an instruction to the northbridge 10 and the southbridge 20 to start sending requests to both the existing address crossbar switch 30 and the new address crossbar switch 40. Specifically, the start-command issuing unit 57 sends (issues) a start-request command (PSWC_START_LRA) to the northbridge 10 and the southbridge 20. In accordance with the start-request command, the northbridge 10 and the southbridge 20 start sending requests to both the existing address crossbar switch 30 and the new address crossbar switch 40.

The stop-command issuing unit 55 can be configured to issue an instruction to stop requests from being sent as well as request responses from being received. Alternatively, the stop-command issuing unit 55 can be configured to issue an instruction to stop only request responses from being received. Specifically, by sending (issuing) a stop-request command (PSWC_STOP_LRA) to the northbridge 10 and the southbridge 20, it can instruct the northbridge 10 and the southbridge 20 not only not to send requests but also not receive any request responses or only not receive any request responses. In such a case, the start-command issuing unit 57 should be configured to issue a start receiving response command (PSWC_START_AXB_MIRROR) along with a start-request command (PSWC_START_LRA), so that the northbridge 10 and the southbridge 20, in accordance with the commands, start sending requests to both the existing address crossbar switch 30 and the new address crossbar switch 40 as well as start receiving responses to the requests from both the existing address crossbar switch 30 and the new address crossbar switch 40.

Figure 4:
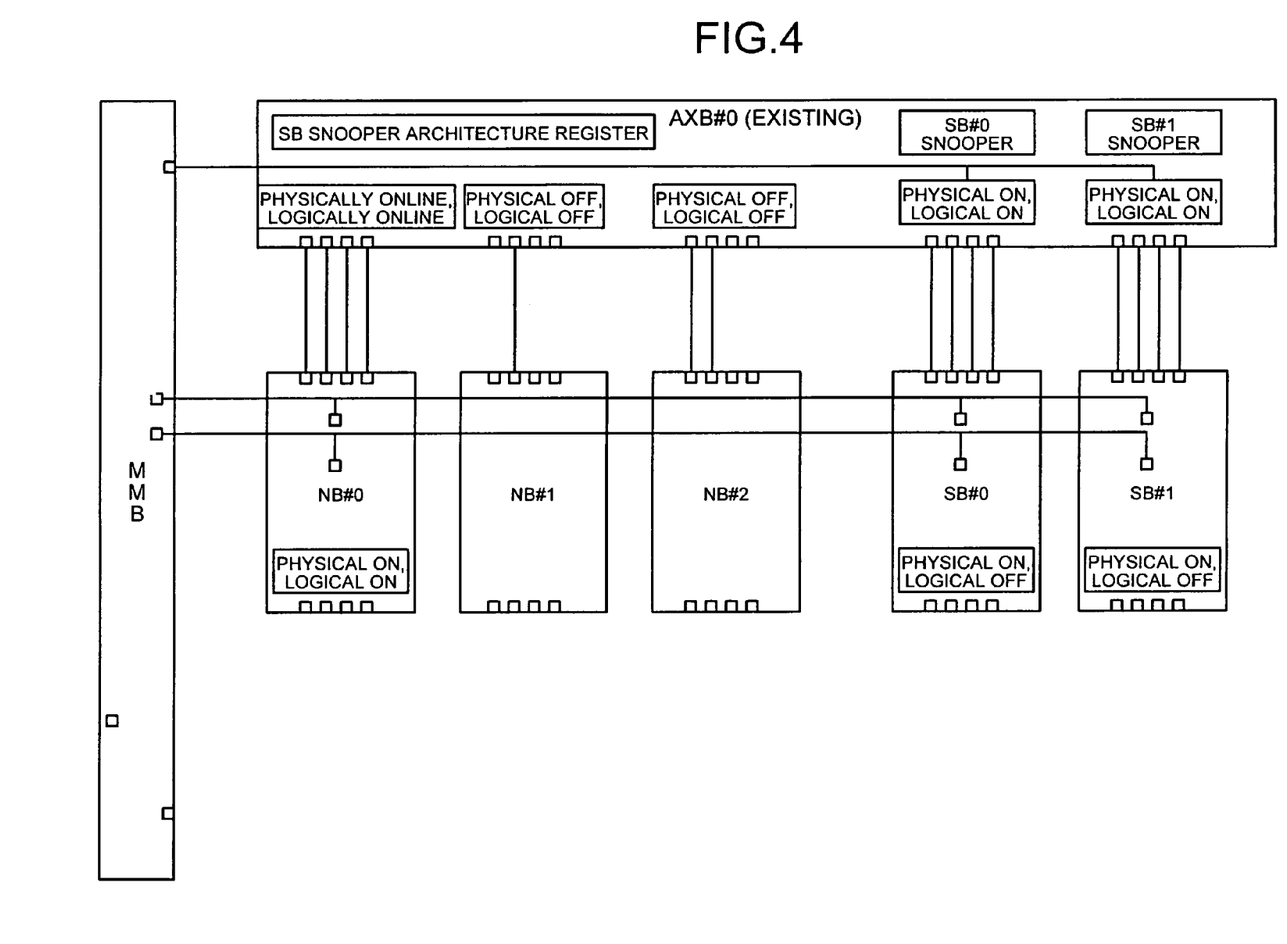
FIGS. 4 to 6 are a schematic for explaining status transitions of the data processing system shown in FIG. 1.
Figure 5:
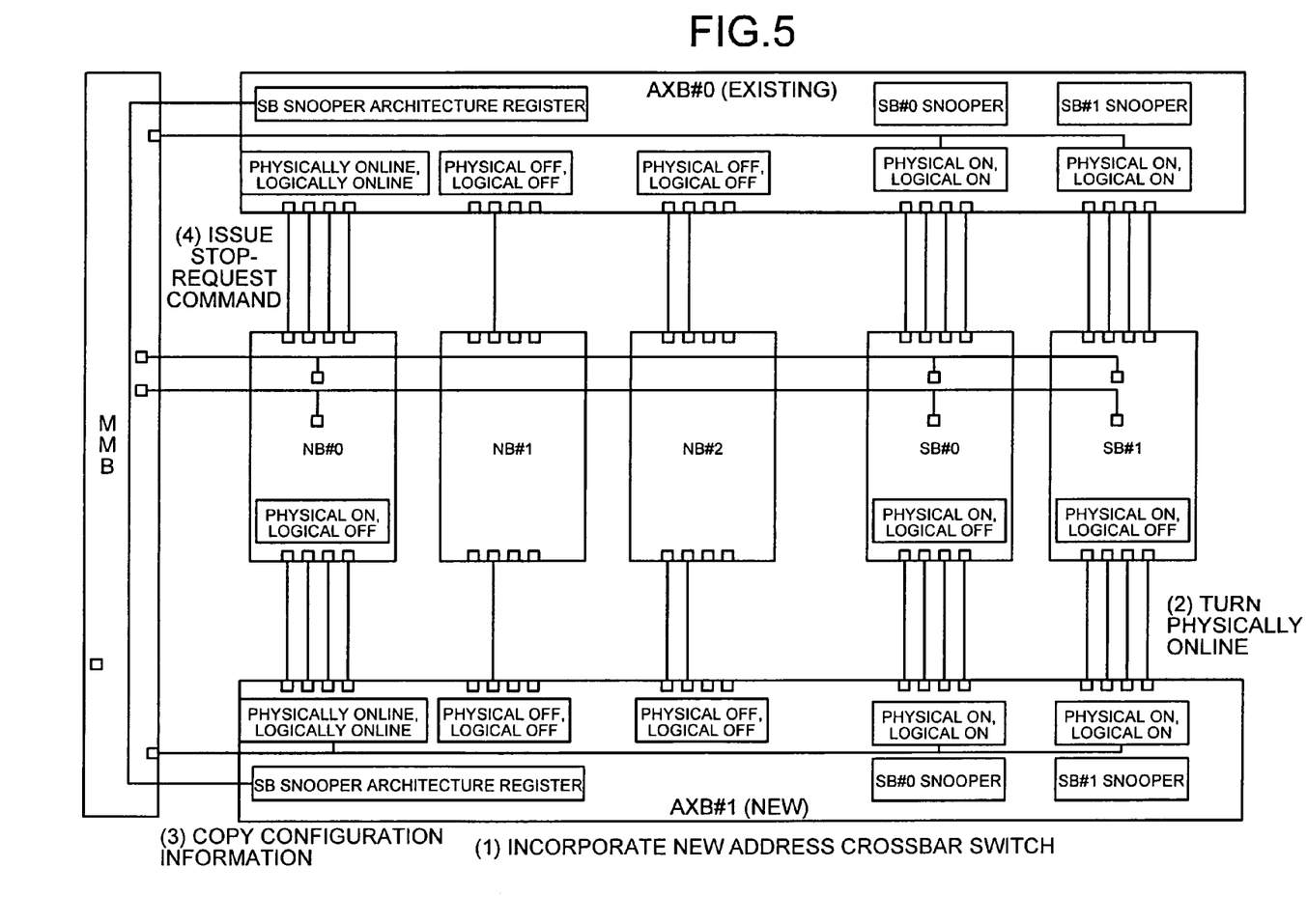
Figure 6:
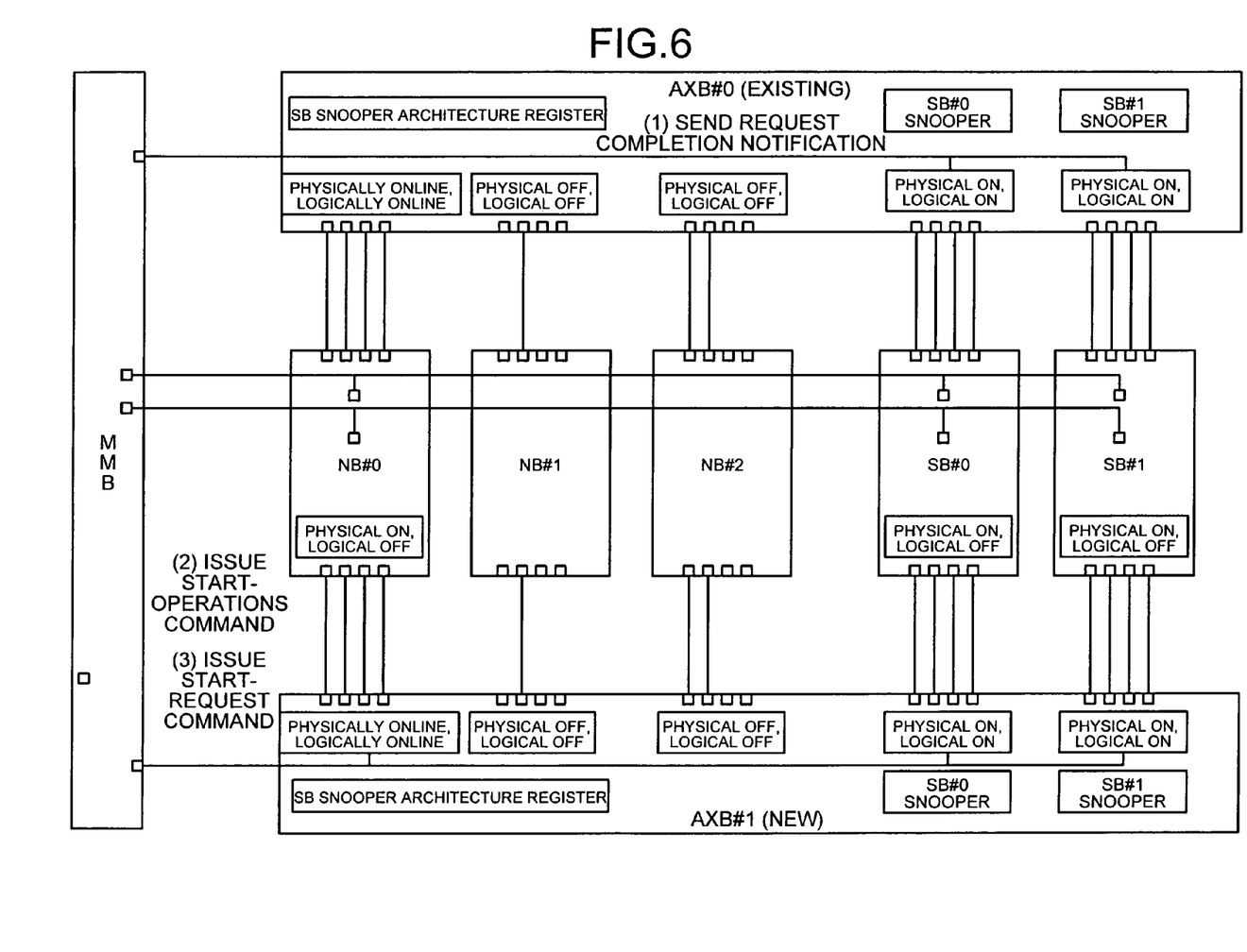
Figure 7:
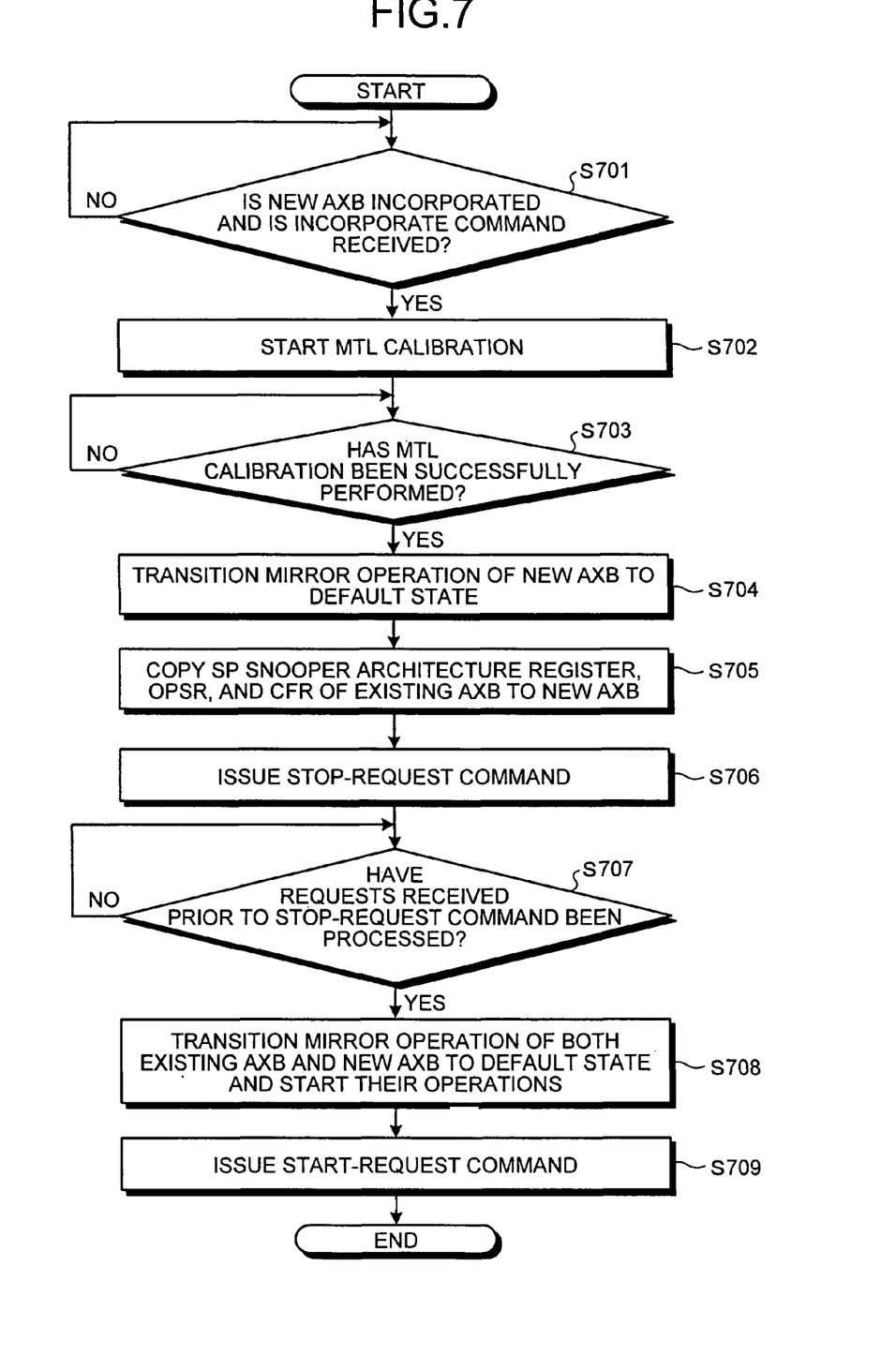
FIG. 7 is a flowchart of processes performed by the data processing system shown in FIG. 2.

The processes of the data processing system are described below with reference to FIGS. 4 to 7. FIGS. 4 to 6 are schematics for explaining the status transitions of the data processing system shown in FIG. 2. FIG. 7 is a flowchart of the processes performed by the data processing system shown in FIG. 2.

The status transitions of the data processing system are described below. The data processing system shown in FIGS. 4 to 7 includes an address crossbar switch AXB#0, three northbridges NB#0 to NB#2, two southbridges SB#0 and SB#1, and an MMB. The address crossbar switch AXB#0, the northbridges NB#0 to NB#2, the southbridges SB#0 and SB#1, and the MMB are equivalent in structure to those shown in FIG. 2. Status transitions of the data processing system is explained when a new address crossbar switch is added to the system.

The address crossbar switch AXB#0, the northbridges NB#0 to NB#2, the southbridges SB#0 and SB#1, and the MMB are interconnected to enable communication among them. The address crossbar switch AXB#0 includes an SB#0 snooper that is a device that controls an IO device connected to southbridge SB#0, and an SB#1 snooper that is a device that controls an IO device connected to the southbridge SB#1. The address crossbar switch AXB#0 includes an SB snooper architecture register that contains data related to which IO device is allocated the southbridges SB#0 and SB#1 and acts as an agent for SB#1 and SB#2, responding to the requests that are sent to the southbridges SB#0 and SB#1. "Physical ON" in FIGS. 4 to 6 indicates a port (connection interface) that has been made connectable by physically calibrating an MTL interface (not shown) when a new address crossbar switch is being incorporated. "Logical ON" in FIG. 4 to FIG. 7 indicates a port that is in a logically connectable state when an address crossbar switch is incorporated into the physical ON port. "Physical OFF" indicates a port that is physically not connectable when a new address crossbar switch is being incorporated, and "Logical OFF" indicates a port that is logically not connectable.

As shown in FIG. 5, when a new address crossbar switch AXB#1 is added into the data processing system (see (1) of FIG. 5), and is turned online (see (2) of FIG. 5), the MMB retrieves the configuration information of the existing address crossbar switch AXB#0, and copies the configuration information to the new address crossbar switch AXB#1 (see (3) of FIG. 5). The stop-command issuing unit (see FIG. 2) of the MMB then issues a stop-request command instructing the northbridges NB#1 to NB#2 to stop sending requests to the existing address crossbar switch AXB#0 (see (4) of FIG. 5).

As shown in FIG. 6, after the MMB issues the stop-request command, the request completion communicating unit (see FIG. 2) of the existing address crossbar switch AXB#0 determines whether all the requests received before the enforcement of the stop-request command have been processed, and if processed, sends a request completion notification to the MMB (see (1) of FIG. 6). Upon receiving the request completion notification, the start-operations command issuing unit (see FIG. 2) of the MMB, sends a start-operations command to both the address crossbar switches AXB#0 and AXB#1 (see (2) of FIG. 6).

After the start-operations command issuing unit (see FIG. 2) issues the start-operations command, the start-command issuing unit (see FIG. 2) of the MMB issues a start-request command to the northbridges NB#0 to NB#2 as well as the southbridges SB#0 and SB#1 to start sending requests to both the address crossbar switches AXB#0 and AXB#1 (see (3) of FIG. 6). In this manner, the new address crossbar switch AXB#1 is incorporated into the system without having to stop the entire system.

The status transitions are explained by a flowchart. As shown in FIG. 7, when the new address crossbar switch (AXB) 40 is introduced and an incorporate command issued by a user is received (Yes at step S701), the MMB 50 commences MTL calibration (step S702), and then checks whether the MTL calibration has been performed successfully (step S703).

If the MTL calibration is successfully performed (Yes at step S703), the MMB 50 causes the mirror operation of the new address crossbar switch 40 to transition to the default state (step S704). The configuration information copying unit 54 of the MMB 50 copies the SB snooper architecture register, OPSR, and CFR of the existing AXB 30 to the new address crossbar switch 40 (step S705).

The stop-command issuing unit 55 of the MMB 50 issues a stop-request command instructing the northbridge 10 to stop sending requests to the existing address crossbar switch 30 (step S706). The request completion communicating unit 35 of the existing address crossbar switch 30 determines whether the requests received prior to the enforcement of the stop-request command have been processed, and finds that the requests have been processed (step S707).

If the requests have been processed (Yes at step S707), the request completion communicating unit 35 of the existing address crossbar switch 30 sends a request completion notification to the MMB 50, upon which the start-operations command issuing unit 56 of the MMB 50 causes the existing address crossbar switch 30 as well as the new address crossbar switch 40 to transition (shift) to the default state (step S708).

Specifically, the start-operations command issuing unit 56 sends a GSA_START command (PSWC_GSA_START) to both the existing address crossbar switch 30 and the new address crossbar switch 40, upon which, the existing address crossbar switch 30 and the new address crossbar switch 40 start operating.

The start-command issuing unit 57 of the MMB 50 then sends a start-request command to the northbridge 10 and the southbridge 20 to start sending requests to both the existing address crossbar switch 30 and the new address crossbar switch 40 (step S709).

Specifically, the start-command issuing unit 50 of the MMB sends (issues) a start-request command (PSWC_START_LRA) to the northbridge 10 and the southbridge 20, upon which the northbridge 10 and the southbridge 20 start sending requests to the existing address crossbar switch 30 and the new address crossbar switch 40.

Thus, according to the first embodiment, when a new data relaying device (AXB 40) that has yet to have configuration information set therein is incorporated into a data processing system, a control device (MMB 50) retrieves configuration information from an existing data relaying device (AXB 30) and copies the configuration information to the new data relaying device (AXB 40). Once the configuration information is copied to the new data relaying device (AXB 40), the control device (MMB 50) instructs request control devices (northbridge 10 and southbridge 20) to stop sending requests to the existing data relaying device (AXB 30) and the new data relaying device (AXB 40). Upon receiving a request completion notification from the existing data relaying device (AXB 30) conveying that all requests received prior to the enforcement of stop-request command have been processed, the control device (MMB 50) instructs both the existing data relaying device (AXB 30) and the new data relaying device (AXB 40) to start operating, and instructs the request control devices (northbridge 10 and southbridge 20) to start sending requests to the existing data relaying device (AXB 30). After the control device (MMB 50) issues the stop-request command, the existing data relaying device (AXB 30) determines whether all the requests received before the enforcement of the stop-request command have been processed, and sends a request completion notification to the control device (MMB 50). Thus, new data relaying devices can be augmented into the system without having to stop the entire system.

For example, in a data processing system having two address crossbar switches, even when one address crossbar switch fails, a new address crossbar switch can be incorporated in its place without having to stop the entire system. Further, a new address crossbar switch can be added in a data processing system that originally includes only one address crossbar switch without having to stop the system.

According to the present invention, the existing data relaying device (AXB 30) includes a snoop circuit that performs a predetermined operation according to the address being accessed by various devices (CPU, etc.), and stores configuration information defining snoop conditions under which the snoop circuit will function. The configuration information of the existing data relaying device (AXB 30) is retrieved and copied to the new data relaying device (AXB 40). As a result, the number of data relaying devices, even if they have processes more minutely shared among themselves, can be augmented by incorporating a new data relaying device into the system without having to stop the entire system.

Exemplary hardware configuration of the data processing system is explained below with reference to FIG. 8. The data processing system includes AdderssXbar #0 and AddressXbar #1, a plurality of system ports (SB#0, etc.), a plurality of IO ports (IOB#0, etc.), and a plurality of DataXbars. Each system port has mounted thereon principal control units such as northbridge or a plurality of CPUs, and principal storage units such a plurality of memory (MemSwitch). Each IO port has mounted thereon local area network (LAN) ports (LAN) that control connection with an external device. AddressXbar #0 and AddressXbar #1 connect with all the northbridges mounted on the system ports and with all the southbridges mounted on the IO ports. Northbridges are connected to DataXbars via MemSwitches. Southbridges are similarly connected to DataXbars.

In the data processing system shown in FIG. 8, when a new AddressXbar that has yet to have configuration information set therein is incorporated into a data processing system, the MMB 50 (see FIG. 2) retrieves configuration information from an existing AddressXbar and copies the configuration information to the new AddressXbar. Once the configuration information is copied to the new AddressXbar, the MMB 50 instructs northbridge and southbridge to stop sending requests to the existing AddressXbar. Upon receiving a request completion notification from the existing AddressXbar conveying that all requests received prior to the enforcement of stop-request command have been processed, the MMB 50 instructs both the existing AddressXbar and the new AddressXbar to start operating, and instructs northbridge and southbridge to start sending requests to the existing AddressXbar. After the MMB 50 issues the stop-request command, the existing AddressXbar determines whether all the requests received before the enforcement of the stop-request command have been processed, and sends a request completion notification to the MMB 50. Thus, new AddressXbars can be augmented into the system without having to stop the entire system.

Various modifications of the data processing system according to the present invention are described below as different embodiments which differ from the first embodiment on account of (1) presence of absence of snoop circuit, (2) Process sequence, (3) System configuration, etc., and (4) Computer program.

(1) Presence or Absence of Snoop Circuit

The address crossbar switch in the first embodiment has a snoop circuit. However, the snoop circuit can be done away with. In the absence of the snoop circuit, configuration information required for making a new address crossbar switch functional can be copied to the new address crossbar switch by retrieving configuration information related to I/O from the southbridge.

(2) Process Sequence

In the first embodiment, configuration information is copied to the new address crossbar switch before the stop-request command is issued. However, the stop-request command can be issued first followed by copying of configuration information to the new address crossbar switch. Configuration information can be copied to the new address crossbar switch at any stage before starting the operations of both the existing address crossbar switch and the new address crossbar switch.

(3) System Configuration

The constituent elements of various devices illustrated are merely conceptual and may not necessarily physically resemble the structures shown in the drawings. For instance, the devices need not necessarily have the structure that is illustrated. Each device as a whole or in parts can be broken down or integrated either functionally or physically in accordance with the load or how the device is to be used (for example, the start-operations command issuing unit 56 and the start command issuing unit 57 can be integrated). The process functions performed by various devices are entirely or partially realized by the CPU or a computer program executed by the CPU or by a hardware using wired logic.

All the automatic processes explained in the embodiment can be, entirely or in part, carried out manually. Similarly, all the manual processes explained in the embodiment can be entirely or in part carried out automatically by a known method. The process procedures, the control procedures, specific names, and data, including various parameters mentioned in the description and drawings can be changed as required unless otherwise specified.

(4) Computer Program

The various processes described in the embodiment can be realized by execution of a ready computer program by a computer system such as a personal computer or workstation. A computer system executing the computer program implementing the functions described in the embodiment is described below.

Figure 9:
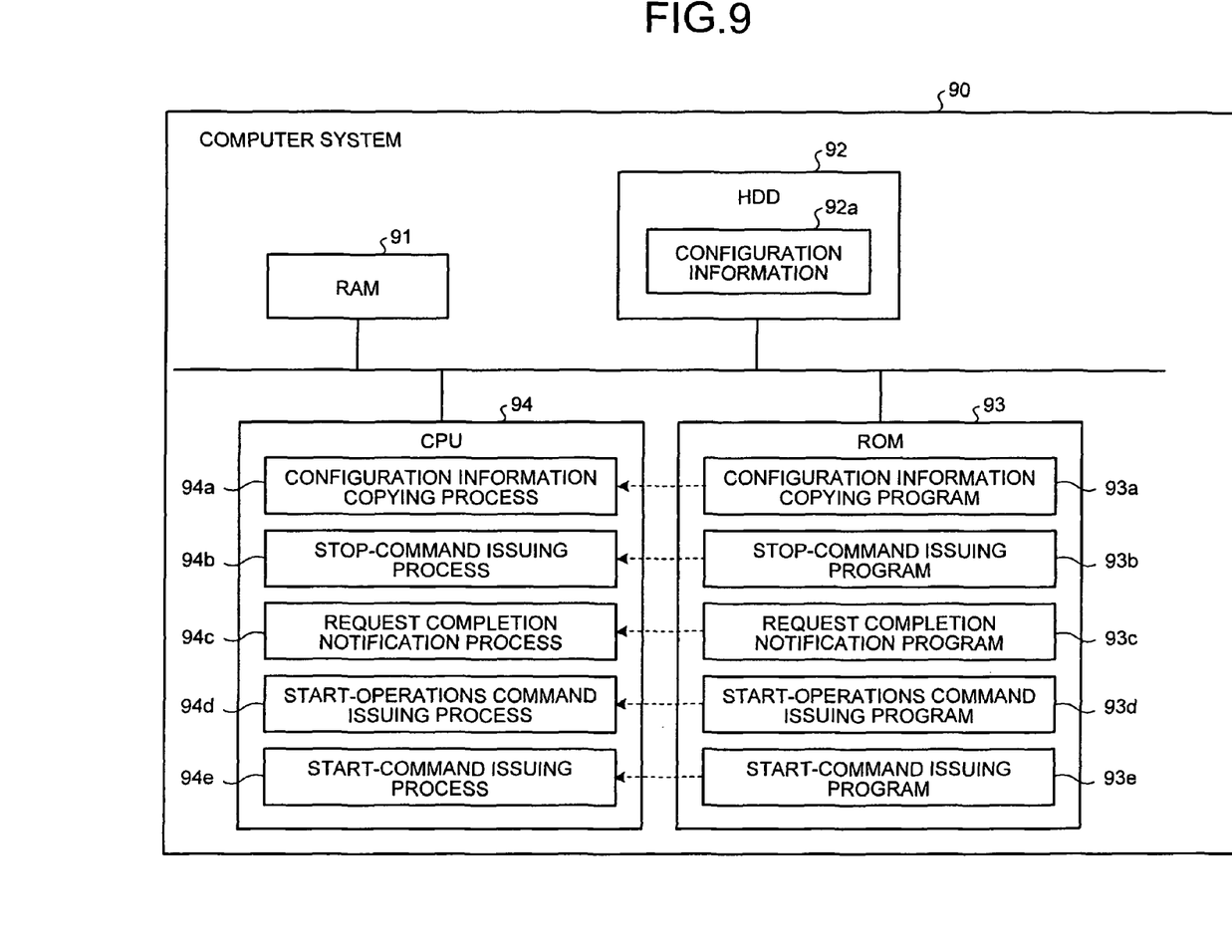
FIG. 9 is a block diagram of a computer system that implements the data processing system shown in FIG. 1 as software.

FIG. 9 is a block diagram of a computer system 90 that executes a computer program (hereinafter, "data processing program" to implement the invention as software. The computer system 90 includes a random access memory (RAM) 91, a hard disk drive 92, a read-only memory 93, and a central processing unit 94. The computer programs that implement the functions described in the embodiment, namely, a configuration information copying program 93*a*, a stop command issuing program 93*b*, a request completion notification program 93*c*, a start-operations command issuing program 93*d*, and a start-command issuing program 93*e*, are pre-installed in the ROM 93.

The CPU 94 reads the configuration information copying program 93*a*, the stop-command issuing program 93*b*, the request completion notification program 93*c*, the start-operations command issuing program 93*d*, and the start-command issuing program 93*e* to perform, respectively, a configuration information copying process 94*a*, a stop-command issuing process 94*b*, a request completion notification process 94*c*, a start-operations command issuing process 94*d*, and a start-command issuing process 94*e*. The configuration information copying process 94*a*, the stop command issuing process 94*b*, the request completion notification process 94*c*, the start-operations command issuing process 94*d*, and the start-command issuing process 94*e*, respectively, correspond to the configuration information copying unit 54, the stop-command issuing unit 55, the request completion notifying unit 35, the start-operations command issuing unit 56, and the start-command issuing unit 57 shown in FIG. 2.

Configuration information 92*a* of the HDD 92 includes SB snooper architecture register, operation register (OPSR), configuration register (CFR), snoop conditions, etc.

The configuration information copying program 93*a*, the stop command issuing program 93*b*, the request completion notification program 93*c*, the start-operations command issuing program 93*d*, and the start-command issuing program 93*e* need not necessarily be installed in the ROM 93 but can be read by the computer system 90 from a portable physical medium such as flexible disk (FD), compact disk-read-only memory (CD-ROM), digital versatile disk (DVD), magneto optic (MO) disk, integrated circuit (IC) card that can be inserted into the host computer. Alternatively, the program can be stored in a non-portable physical medium such as hard disk device (HDD) provided in the host computer internally or externally, or on another computer (or server) connected to the computer over a public circuit, Internet, local area network (LAN), or wide area network (WAN).

In other words, the data processing program according to the embodiment recorded in a portable physical medium, or a fixed medium, or a communication medium is computer-readable, and enables the computer system 90 to read and execute the computer program to realize the same functions as those described in the first embodiment. According to another embodiment, another computer and a server can, individually or in a coordinated manner, execute the data processing program to realize the same functions as those described in the first embodiment.

According to an aspect of the present invention, when a new data relaying device is incorporated into a data processing system, configuration information is read from an existing data relaying device and the configuration information is copied to the new data relaying device. Therefore, new data relaying devices can be augmented into the system without having to stop the entire system.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing system including a plurality of data relaying devices, a plurality of request control devices connected to each of the data relaying devices, a control device connected to the data relaying devices and the request control devices, and a device under the control of each of the request control devices, wherein the control device includes a configuration information copying unit that, when a new data relaying device not having a configuration information is incorporated in the data processing system, retrieves the configuration information from an existing data relaying device and copies the retrieved configuration information to the new data relaying device;

a stop-command issuing unit that issues a stop-request command instructing the request control devices to stop sending a request from the device to the existing data relaying device when the configuration information copying unit completes copying of the configuration information;

a start-operations command issuing unit that issues a start-operations command instructing all the data relaying devices to start operating, upon receiving a request completion notification indicating that a previous request received by the existing data relaying devices before the enforcement of the stop-request command have been processed; and a start-command issuing unit that issues a start-request command instructing the request control devices to start sending the request to the data relaying devices, once the start-operations command issuing unit issues the start-operations command, and each of the data relaying devices includes a request completion notifying unit that determines whether the previous request has been processed, upon suspension of sending of the request by the control device, and sends the request completion notification to the control device if the previous request have been processed.

2. The data processing system according to claim 1, wherein each of the data relaying device includes a snoop circuit that performs a predetermined operation according to an address being accessed by the device, and stores therein the configuration information defining snoop conditions for the operation of the snoop circuit, and the configuration information copying unit retrieves the configuration information defining the snoop conditions from the existing data relaying device, and copies the retrieved configuration information to the new data relaying device.

3. A method of controlling a data processing system including a plurality of data relaying devices, a plurality of request control devices connected to each of the data relaying devices, a control device connected to the data relaying devices and the request control devices, and a device under the control of each of the request control devices, the control device performs retrieving, when a new data relaying device not having a configuration information is incorporated in the data processing system, the configuration information from an existing data relaying device and copies the retrieved configuration information to the new data relaying device;

first issuing including issuing a stop-request command instructing the request control devices to stop sending a request from the device to the existing data relaying device when the copying is completed;

second issuing including issuing a start-operations command instructing all the data relaying devices to start operating, upon receiving a request completion notification indicating that a previous request received by the existing data relaying devices before the enforcement of the stop-request command have been processed; and third issuing including issuing a start-request command instructing the request control devices to start sending the request to the data relaying devices, once the start-operations command is issued the second issuing, and each of the data relaying devices performs determining whether the previous request received has been processed, upon suspension of sending of the request by the control device, and sending the request completion notification to the control device if the requests have been processed.

4. The method according to claim 3, wherein each of the data relaying devices includes a snoop circuit that performs a predetermined operation according to an address being accessed by the device, and stores therein the configuration information defining snoop conditions for the operation of the snoop circuit, and the copying includes retrieving the configuration information defining the snoop conditions from the existing data relaying device, and copying the retrieved configuration information to the new data relaying device.

5. An information processing device including a control device connected to a plurality of data relaying devices, wherein the information processing device further includes:

a configuration information copying control unit that controls communication among the data relaying devices; and a configuration information copying unit that, when a new data relaying device is connected to the control device, reads a configuration information of an existing data relaying device connected the control device and writes the configuration information to the new data relaying device.

6. The information processing device according to claim 5, further including a request control device that is connected to the control device, and that sends a request to the data relaying devices; and a stop-command issuing unit that issues a stop-request command which stops sending the request to the request control device when the configuration information is written to the new data relaying device.

7. The information processing device according to claim 6, wherein each of the data relaying devices includes a storage unit that stores therein the configuration information common to the data relaying devices;

a communication control unit that controls communication with the control device; and a processing unit that determines whether a previous request received before the enforcement of the stop-request command has been processed, and sends a request completion notification to the control device if the previous request have been processed.

* * * * *

UNITED STATES PATENT AND TRADEMARK OFFICE
CERTIFICATE OF CORRECTION

| | | |
|---|---|---|
| PATENT NO. | : 7,913,028 B2 | Page 1 of 1 |
| APPLICATION NO. | : 11/785903 | |
| DATED | : March 22, 2011 | |
| INVENTOR(S) | : Takayuki Kinoshita et al. | |

It is certified that error appears in the above-identified patent and that said Letters Patent is hereby corrected as shown below:

Title page, Item (54) (Title), Line 3 delete "APARATUS" and insert -- APPARATUS --, therefor.

Column 1, Line 3 delete "APARATUS" and insert -- APPARATUS --, therefor.

Column 16, Line 33 in Claim 5, after "information" delete "copying".

Column 16, Line 39 in Claim 5, after "connected" insert -- to --.

Signed and Sealed this
Thirty-first Day of May, 2011

David J. Kappos
*Director of the United States Patent and Trademark Office*